No. 782,154.  
Patented February 7, 1905.

UNITED STATES PATENT OFFICE.

MITFORD C. MASSIE, OF WASHINGTON, DISTRICT OF COLUMBIA, ADMINISTRATOR OF FRITZ ACH, DECEASED, ASSIGNOR TO C. F. BOEHRINGER & SOEHNE, OF MANNHEIM-WALDHOF, BADEN, GERMANY, A FIRM.

PREPARATION OF THEOPHYLLIN.

SPECIFICATION forming part of Letters Patent No. 782,154, dated February 7, 1905.

Application filed February 7, 1903. Serial No. 142,591.

*To all whom it may concern:*

Be it known that FRITZ ACH, deceased, late a citizen of Germany, and a resident of Mannheim, did invent new and useful Improvements in the Preparation of Theophyllin; and I, MITFORD C. MASSIE, the duly-constituted administrator of the estate of FRITZ ACH, deceased, do hereby declare the following to be a full, clear, and exact description of the said invention of said decedent, such as will enable others skilled in the art to which it appertains to make and use the same.

In United States Patent No. 660,744 a process for the preparation of paraxanthin or 1.7-dimethylxanthin has been described. That process starts with a 1.7-dimethyl-3-chloromethyl-8-chloroxanthin having the structural formula:

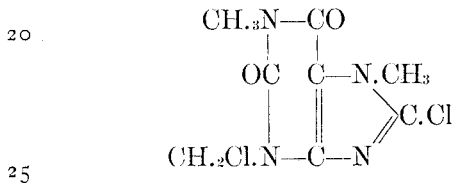

and which, as set forth in said patent, is prepared by subjecting 8-chlorocaffein to the chlorinizing action of a mixture of phosphorus pentachlorid and phosphorus oxychlorid at a temperature of about 150° centigrade. It was found by this inventor that the chlorination of chlorocaffein may be made to proceed in other ways and to take a different course if a solution of chlorin is caused to react upon the chlorocaffein in a suitable medium—such as phosphorus oxychlorid, nitrobenzol—and at a temperature of 50° centigrade or more. This medium must be capable of simultaneously dissolving considerable quantities of chlorin and at least a moderate amount of chlorocaffein at the temperature of the reaction. This property is, for example, common to the phosphorus oxychlorid and the nitrobenzol. Under these conditions no substitution of chlorin for a hydrogen atom of the methyl group bound to the nitrogen atom in the position 3 takes place, as in the substituted xanthin employed under the aforesaid patent; but the chlorin atom takes the place of hydrogen atom in the methyl group in the position 7, so that in this case a 7'-8-dichlorocaffein having the structural formula

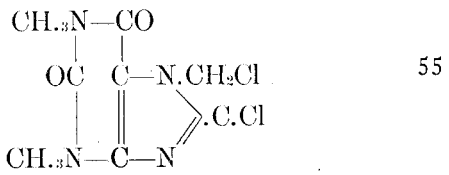

is obtained. In this 7'-8-dichlorocaffein the chloromethyl group is readily split off similarly to the isomers described in the said United States Patent No. 660,744. If this body is heated with water, dilute acids, or alkalies, it is hydrolized concurrently with the formation of formic aldehyde and hydrochloric acid, 8-chlorotheophyllin or 1.3-dimethyl-8-chloroxanthin being formed according to the equation:

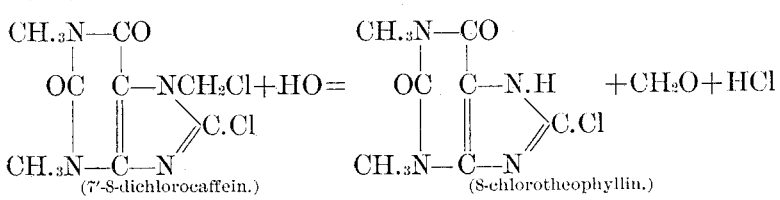

The chlorotheophyllin thus obtained may readily be converted into the valuable therapeutic agent theophyllin by reduction methods, as set forth in United States Patent No. 569,489 to C. F. Boehringer & Soehne, assignees of Emil Fischer.

In order to make a complete disclosure of the present invention, the same will be now described in detail by setting forth two examples of what are considered the preferred methods of carrying the same into practice.

*Example 1*—(*a*) *Preparation of 7'-8-dichlorocaffein.*—Twenty-three grams of dried chlorocaffein are heated in a sealed or air-tight vessel—that is to say, under pressure—together with one hundred cubic centimeters of phosphorus oxychlorid containing nine grams of chlorin gas in solution to and maintained at a temperature of 100° centigrade for nine hours. The whole is then allowed to cool, and the phosphorus oxychlorid is distilled off *in vacuo*. After the distillation is completed the new compound—the dichlorocaffein—is left as a residue in an almost pure condition. When dissolved in hot methyl alcohol, it crystallizes in long needles united to form wart-like aggregations, which melt at 145° centigrade. It is utilized for the manufacture of 8-chlorotheophyllin by proceeding as follows:

(*b*) *Preparation of 8-chlorotheophyllin.*—One part, by weight, of 7'-8-dichlorocaffein is boiled for an extended period of time with ten parts, by weight, of water, during which treatment a strong odor of formic aldehyde arises, and complete solution takes place gradually. From this solution the 8-chlorotheophyllin formed as a result of this process is obtained by concentration. It has all of the properties enumerated, *e. g.*, by Emil Fischer and Lorenz Ach in *Berichte der Deutschen Chemischen Gesellschaft*, Vol. 28, page 3139. It may be reduced to theophyllin by known methods.

It is of course not necessary to isolate or separate the dichlorocaffein in order to obtain the chlorotheophyllin, but the conversion may proceed from chlorocaffein to chlorotheophyllin in one operation, as shown in the following example:

*Example 2*—*Direct conversion of 8-chlorocaffein to 8-chlorotheophyllin.*—Forty-five grams of 8-chlorocaffein are suspended in four hundred cubic centimeters of nitrobenzol, and into this suspension, while maintained at a temperature of 50° centigrade and while constantly stirring or otherwise agitating the same, chlorin is introduced in excess. It is preferable to add about 0.5 grams of iodin to the liquor. During the introduction of chlorin solution slowly takes place, and the major portion of the nitrobenzol is then distilled off in a vacuum, the balance of the nitrobenzol being then driven off by means of steam. The residue is then further treated with steam, or, in other words, with water in a gaseous or vaporous state, by passing currents of steam over or into the same or otherwise until only a faint odor of formic aldehyde can be noticed. This causes the chlorotheophyllin and a small amount of chlorocaffein to go into solution, while the bulk of the chlorocaffein remains undissolved. The whole is then filtered, and the filtrate is thereupon evaporated to dryness. From the residue the 8-chlorotheophyllin is extracted with an aqueous solution of ammonia and then precipitated from the ammoniacal solution by acids. It is understood, of course, that instead of the nitrobenzol phosphorus oxychlorid can be employed as a solvent of the chlorin.

It will be noted from the above two examples that in both cases the 7'-8-dichlorocaffein is first obtained, whereupon the solvent of the chlorin—the phosphorus oxychlorid of the first example or the nitrobenzol of the second example—is driven off by distillation, leaving a residue consisting mainly of the dichlorocaffein. In both cases the dichlorocaffein is heated with water, in the first case by boiling with water and in the second case by passing steam over or into the same. Finally, in both cases the solution of the 8-chlorotheophyllin is concentrated in order to obtain the final product, the chlorotheophyllin.

While in this specification has been described the use of, in connection with the other steps of the process of this application, nitrobenzol as an example of a solvent for chlorin and while the same is generically covered in the claims, it is not herein specifically claimed, since such use is covered in the application, Serial No. 190,566, filed January 25, 1904, (Case O'.)

Having thus fully described the invention, what is claimed as new, and desired to be secured by Letters Patent, is—

1. The process which consists in causing a solution of chlorin to react on 8-chlorocaffein.

2. The process which consists in causing a solution of chlorin to react on 8-chlorocaffein and then distilling off the solvent of the chlorin, in order to separate 7'-8-dichlorocaffein.

3. The process which consists in heating 8-chlorocaffein together with a solution of chlorin.

4. The process which consists in heating dried chlorocaffein in a solution of chlorin under pressure.

5. The process which consists in heating dried chlorocaffein in a solution of chlorin under pressure, and then distilling off the solvent of the chlorin.

6. The process which consists in heating 8-chlorocaffein with chlorin contained in a solvent which is capable of dissolving chlorin and chlorocaffein when heated.

7. The process which consists in submitting 8-chlorocaffein to the action of chlorin dissolved in phosphorus oxychlorid, and then distilling off the solvent.

8. The process which consists in heating 8-chlorocaffein with chlorin dissolved in phosphorus oxychlorid, and then distilling off the solvent.

9. The process which consists in heating 8-chlorocaffein with chlorin dissolved in phosphorus oxychlorid in substantially the proportions hereinbefore given.

10. The process which consists in heating 8-chlorocaffein with chlorin dissolved in phosphorus oxychlorid, the proportions of the three ingredients being substantially as given, then cooling and then distilling off the solvent of chlorin.

11. As a new chemical compound, 7'-8-dichlorocaffein having the structural formula as given above, the same crystallizing out of methyl alcohol in the form of aggregated long needles which melt at about 145° centigrade.

12. The process of preparing 8-chlorotheophyllin which consists in heating 7'-8-dichlorocaffein with water.

13. The process of preparing 8-chlorotheophyllin which consists in heating dichlorocaffein with water until the same goes into solution.

14. The process of preparing 8-chlorotheophyllin which consists in heating dichlorocaffein with water until the same goes into solution, and then concentrating the solution.

15. The process of preparing 8-chlorotheophyllin which consists in treating 7'-8-dichlorocaffein with steam.

16. The process of preparing 8-chlorotheophyllin which consists in treating 7'-8-dichlorocaffein with steam until solution is effected and only a faint formic-aldehyde odor remains.

17. The process of preparing 8-chlorotheophyllin which consists in treating 7'-8-dichlorocaffein with steam until solution is effected and only a faint formic-aldehyde odor remains and then filtering, evaporating the filtrate to dryness and extracting the chlorotheophyllin from the residue with ammonia.

18. The process of preparing 8-chlorotheophyllin which consists in treating 7'-8-dichlorocaffein with steam until solution is effected and only a faint formic-aldehyde odor remains and then filtering, evaporating the filtrate to dryness, extracting the chlorotheophyllin from the residue, and, finally precipitating the chlorotheopyhyllin with acid.

19. The process of preparing 8-chlorotheophyllin which consists in causing a solution of chlorin to react on 8-chlorocaffein, then driving off the solvent of the chlorin, and then treating the residue with water until solution takes place.

20. The process of preparing 8-chlorotheophyllin which consists in causing a solution of chlorin to react on 8-chlorocaffein, then driving off the solvent of the chlorin, then treating the residue with water until solution takes place, and then concentrating the solution.

21. The process of preparing 8-chlorotheophyllin which consists in heating 8-chlorocaffein together with a solution of chlorin, then driving off the solvent of chlorin, then heating the residue with water until solution takes place, then concentrating the solution.

22. The process which consists in heating 8-chlorocaffein with chlorin when contained in a solvent which is capable of dissolving chlorin and chlorocaffein when heated, then driving off the solvent, then heating the residue with water until solution takes place, and then concentrating the solution.

23. The process which consists in heating 8-chlorocaffein with a solution of chlorin in phosphorus oxychlorid, cooling and distilling off the phosphorus oxychlorid, then heating the residue with water until solution takes place, and then concentrating the solution.

24. The process of preparing 8-chlorotheophyllin which consists in causing chlorin to react on 8-chlorocaffein, heating the resultant 7'-8-dichlorocaffein with water until solution occurs, then concentrating the solution to dryness, and isolating the chlorotheophyllin from the residue.

25. The process of preparing 8-chlorotheophyllin which consists in heating 8-chlorocaffein in a solution of chlorin in phosphorus oxychlorid, cooling and distilling off the phosphorus oxychlorid, then boiling the 7'-8-dichlorocaffein of the residue with water until solution takes place and then isolating the resultant 8-chlorotheophyllin by concentration.

In testimony whereof I affix my signature in presence of two witnesses.

MITFORD C. MASSIE,
*Administrator of the estate of Fritz Ach, deceased.*

Witnesses:
   ALBANUS S. T. JOHNSON,
   L. E. A. O'KEEFFE.